United States Patent
Hasnik

[11] Patent Number: 5,806,354
[45] Date of Patent: Sep. 15, 1998

[54] LOCKING ARRANGEMENT FOR AN AIR BAG CANISTER

[76] Inventor: Dean C. Hasnik, 15710 Sussex St., Livonia, Mich. 48154

[21] Appl. No.: 782,633

[22] Filed: Jan. 14, 1997

[51] Int. Cl.⁶ .................................................. B60R 25/00
[52] U.S. Cl. ................................. 70/237; 70/232; 70/58; 248/553; 411/910
[58] Field of Search .............................. 411/910; 248/553; 70/14, 58, 209, 232, 237, 258, 416, 417, 158, 163–169, DIG. 57

[56] References Cited

U.S. PATENT DOCUMENTS

| | | | |
|---|---|---|---|
| 3,600,914 | 8/1971 | Johnson | 70/232 |
| 3,605,460 | 9/1971 | Singer et al. | 70/232 |
| 3,817,065 | 6/1974 | Sander | 70/232 |
| 3,910,079 | 10/1975 | Gassaway | 70/58 |
| 4,022,037 | 5/1977 | Walters | 70/232 |
| 4,023,386 | 5/1977 | Walters | 70/164 |
| 4,065,946 | 1/1978 | Loynes et al. | 70/58 |
| 4,117,700 | 10/1978 | Saunders | 70/58 |
| 4,131,173 | 12/1978 | Boersma | 70/160 X |
| 4,248,069 | 2/1981 | Burbank | 70/160 |
| 4,603,829 | 8/1986 | Koike et al. | 248/553 |
| 4,621,230 | 11/1986 | Crouch et al. | 411/910 X |
| 4,656,848 | 4/1987 | Rose | 70/232 X |
| 4,696,449 | 9/1987 | Woo et al. | 248/553 |
| 4,856,305 | 8/1989 | Adams | 70/58 |
| 4,862,715 | 9/1989 | Cykman | 70/58 |
| 5,010,748 | 4/1991 | Derman | 70/164 |
| 5,076,079 | 12/1991 | Manoson et al. | 248/553 X |
| 5,183,289 | 2/1993 | Zeller et al. | 280/743 |
| 5,214,945 | 6/1993 | Martin | 70/232 |
| 5,392,621 | 2/1995 | Dunnigan | 70/232 |
| 5,433,094 | 7/1995 | Sandin et al. | 70/58 |
| 5,469,726 | 11/1995 | Rushing | 70/232 |
| 5,595,078 | 1/1997 | Harrell | 70/209 |

FOREIGN PATENT DOCUMENTS 8502447  6/1985  WIPO .................................. 411/910

*Primary Examiner*—Suzanne Dino Barrett
*Attorney, Agent, or Firm*—John R. Benefiel

[57] ABSTRACT

A theft deterrent arrangement for a passenger side air bag assembly includes hollow bolt shield cylinders surrounding mounting bolts holding the air bag assembly to a fixed cross member, a locking cylinder locked in place to prevent access to the bolt head. Removal of the locking cylinder with a key allows removal of the bolts and air bag by use of a socket wrench.

3 Claims, 2 Drawing Sheets

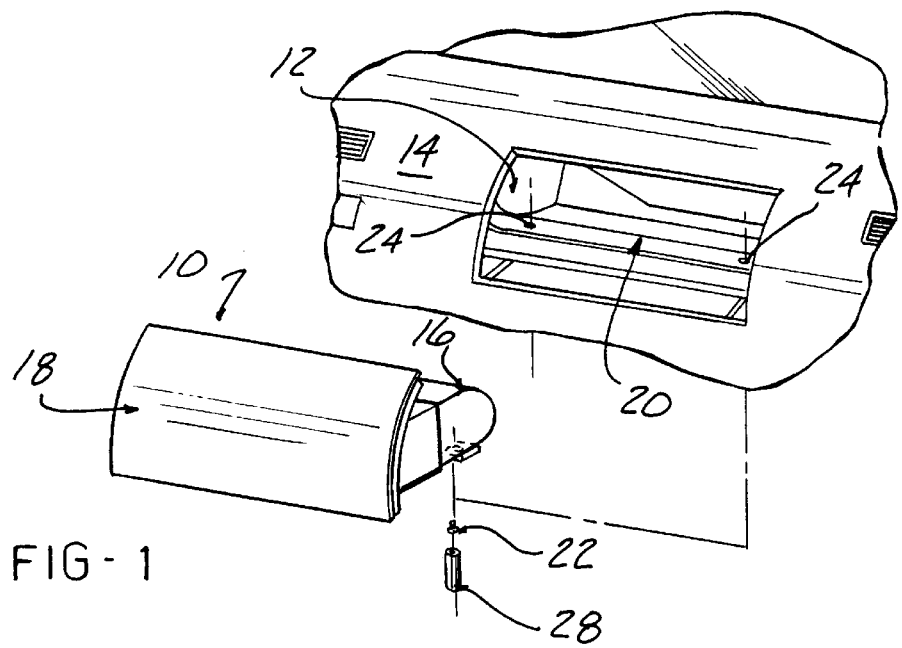
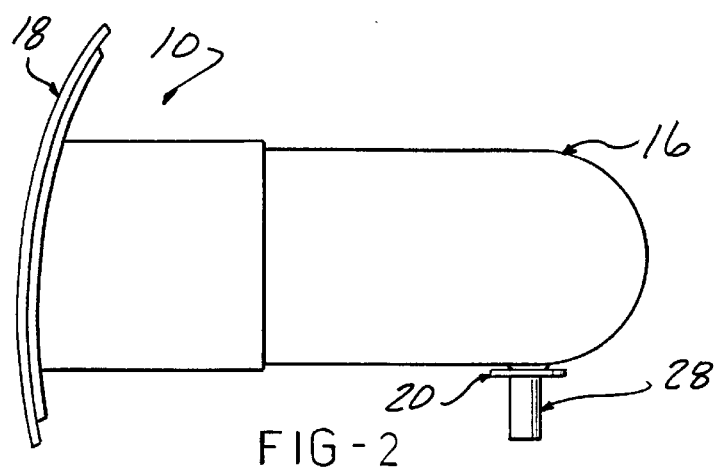
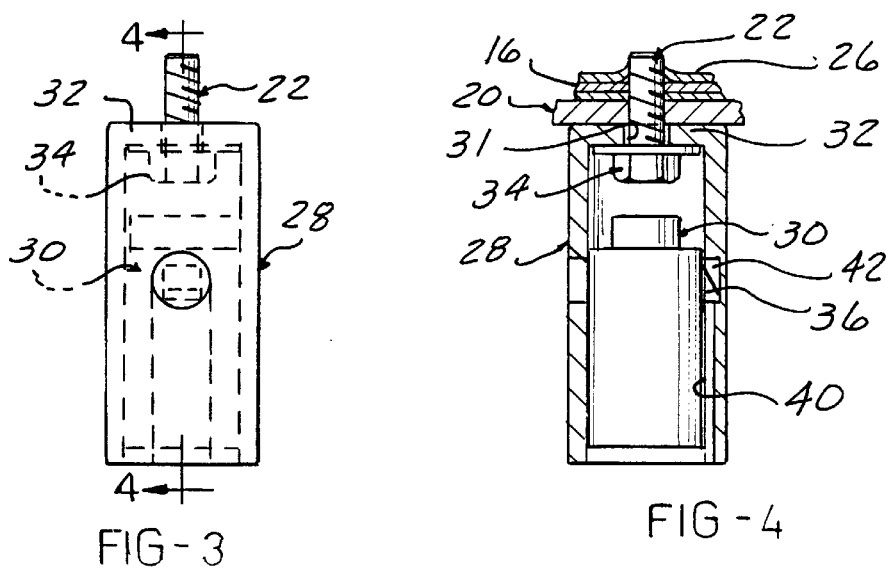

LOCKING ARRANGEMENT FOR AN AIR BAG CANISTER

BACKGROUND OF THE INVENTION

This invention concerns air bag installations and theft deterrent arrangements to prevent unauthorized removal of a passenger side air bag canister from the instrument panel.

Air bags are costly equipment items and need to be replaced after being deployed in an accident. Hence, there has developed a thriving black market in stolen air bag canisters such that air bag theft has become a substantial problem.

Devices have been developed to block access to the driver's side air bag by a locked on blocking shield which is removed when the car is to be driven.

There has not heretofore been developed an effective theft deterrent arrangement for the passenger side air bag canister as blocking shields for the passenger side are not practical.

In any event, shield devices are bulky and inconvenient as they must be installed and removed every time the vehicle is operated.

Accordingly, it is an object of the present invention to provide a theft deterrent arrangement for passenger side air bag canisters which is effective, yet does not create any inconvenience to the operator of the vehicle.

SUMMARY OF THE INVENTION

This object is achieved by installing a locked bolt shield over each head of a pair of mounting bolts which secure the air bag canister to a fixed structural cross member holding the instrument panel.

The locking shield comprises a thick-walled, hollow steel shield cylinder open at one end and closed at the other with an endwall having a hole drilled to receive the shank of a mounting bolt. The head of the bolt is captured by the surrounding end wall.

A lock cylinder is slidably fit into the bolt shield cylinder with a shallow longitudinal groove extending along the inside wall thereof leading to a deeper locking recess extending into the inside wall. The locking cylinder has a locking tang which is captured in the seat when the lock is key operated to extend the tang.

The locking cylinder is releasable by operating a key to retract the tang and withdraw it from the seat and then sliding the locking cylinder out.

The recess is preferably formed by drilling by a tool extending across the diameter and into the inside of the opposite wall of the shield cylinder.

The locking cylinder is recessed within the shield cylinder.

The air bag canister is installed by using two bolts, each protected by a bolt shield cylinder, which bolts pass through a fixed cross member and are threaded into a nut retainer clip within the air bag canister. The bolts are thus entirely inaccessible to engagement with a wrench after the locking cylinders are installed. Removal of the air bag canister is thus deterred, yet can easily be accomplished by using keys to remove the lock cylinders and access the bolt heads with a socket wrench.

DESCRIPTION OF THE DRAWINGS

FIG. 1 is an exploded perspective view of a portion of an instrument panel, an air bag assembly installed therein, and bolt shields to enclose mounting bolts according to the concept of the present invention.

FIG. 2 is a side elevational view of the air bag installation.

FIG. 3 is an enlarged side elevational view of a theft deterrent bolt shield and mounting bolt used to secure the air bag.

FIG. 4 is a sectional view of the bolt shield and mounting bolt shown in FIG. 3 with fragmentary portions of the air bag canister and strut to which it is affixed.

DETAILED DESCRIPTION

Figure 6:
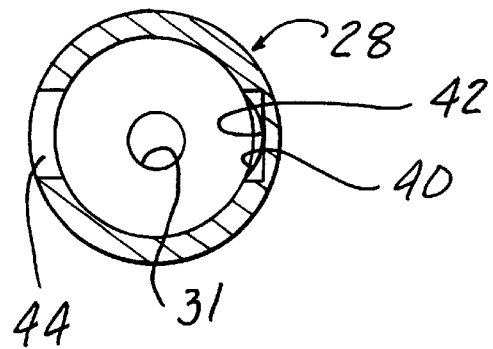
FIG. 6 is a transverse sectional view taken across the bolt shield cylinder.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIG. 1, a passenger side air bag assembly 10 is depicted adapted to be fit into an opening 12 in an instrument panel 14 of an automobile. The air bag assembly 10 includes a sheet metal canister 16 containing the folded air bag (not shown) and an associated gas generator to enable inflation at the moment a severe collision is detected. A door panel 18 covers the canister 16 and is configured to be fit in the opening 12. The panel 18 hinges open as the air bag deploys to allow the bag to expand into the passenger space in the well known manner.

The air bag installation is mounted as a unit by being fastened to a fixed cross member 20 forming a part of the instrument panel support.

Two or more mounting bolts 22 pass through holes 24 in the fixed cross member 20 and are received in threaded clip retainers 26 secured to the canister 16.

According to the concept of the present invention, a thick walled steel hollow bolt shield cylinder 28 is installed over each of the mounting bolts 22 to deter their removal.

The bolt shields 28 are elongated so as to be able to receive a lock cylinder 30 from the open opposite end. Each bolt 22 passes through an opening 31 in an end wall 32 closing off one end of the bolt shield, the head 34 of the bolt bearing on the inside of the end wall 32 as it is tightened.

The lock cylinder 30, when in place, prevents access to the bolt head 34 to prevent removal of the bolt 22 with a long socket wrench.

Figure 5:
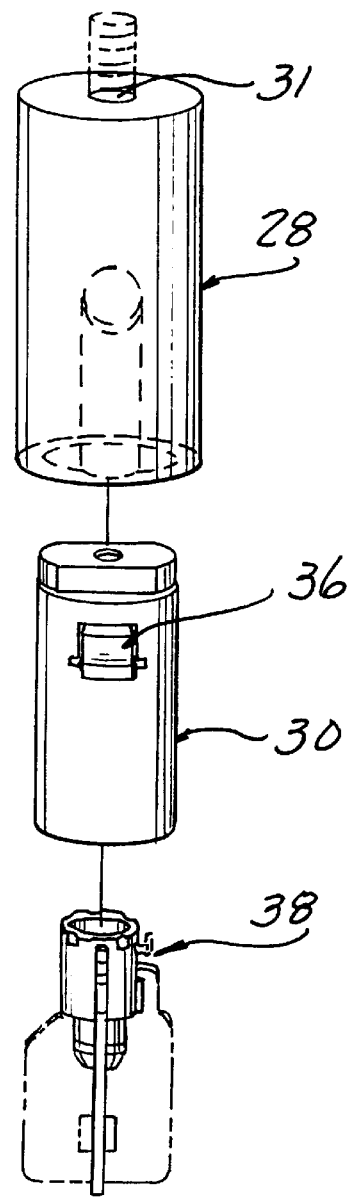
FIG. 5 is an exploded perspective view of the bolt shield cylinder, locking cylinder, and key.

The locking cylinder 30 is of a standard vending machine type, which has a spring-loaded tang 36 (FIGS. 3, 4) which can be retracted by rotation of a key 38 (FIG. 5) inserted at its end facing the open end of bolt shield cylinder 28.

A lengthwise shallow groove 40 is machined in from the open end, terminating in a locking recess 42 extending deeper into the wall of the bolt shielding cylinder 28.

The shallow groove 40 allows the tang 36 to be properly aligned with the recess 42 when the locking cylinder 30 is inserted, and also accommodates the slightly protruding tang 36 when it is retracted.

The locking recess 42 can be formed by access of an end wall through a drilled hole 44 in the opposite wall.

The locking cylinder 30 is assembled in the bolt shield cylinder 28 with locking tang 36 aligned in the groove 40.

Rotation of the key 38 extends the tang 36 to be firmly seated in the recess 42, preventing removal of the bolt 22.

Insertion of the key 38 and rotation retracts the tang 36, allowing the locking cylinder to be withdrawn.

The bolt shield cylinder 28 is thus opened at one end, allowing a socket wrench to be inserted to remove the bolts 22, and allow removal of the air bag canister 16.

The bolt shield cylinders 28 can be left in place more or less permanently and will not interfere with normal operation of the vehicle so that the driver is not inconvenienced.

At the same time, the locking shield cylinders are entirely enclosed to defeat any attempts at removal. The location of the bolt shields beneath the instrument panel would make it difficult for a would-be thief to get at the crossbar or bolts to discourage removal as by cutting of the crossbar or other similar time-consuming efforts to defeat this theft deterrent arrangement.

I claim:

1. A bolt shielding device comprising:

a steel, thick-walled hollow bolt shielding steel cylinder having an internal bore extending lengthwise into said shielding cylinder, said bore open at one end and closed off with an end wall of said shielding cylinder at another end, said end wall having a hole formed therein to accept a bolt shank, an inside diameter of said bore in said bolt shielding cylinder accepting a head of said bolt with a clearance sufficient to allow a socket wrench to be inserted into said open end and onto said bolt head;

a locking cylinder slidably fit into said inside diameter and having a tang projecting into a locking recess formed into said inside diameter, said locking tang retractable by a key operation to allow removal thereof;

a lengthwise shallow groove extending into a wall surface of said inside diameter of said bore and extending lengthwise from said open end of said bore and into said recess, said recess aligned with said groove and extending deeper into said wall than said groove.

2. The bolt shielding device according to claim 1 wherein a hole is formed in said bolt shield cylinder at a location opposite and aligned with said locking recess, said locking recess extending only partially into said wall surface to not penetrate to the exterior of said shielding cylinder.

3. A passenger side air bag installation for an instrument panel comprising:

an air bag assembly including a canister;

a fixed cross member extending behind an opening in said instrument panel;

a pair of bolts each extending through a corresponding hole in said cross member and into said canister;

a pair of steel, thick-walled, hollow bolt shield cylinders each enclosing a head of a respective bolt, each bolt shield cylinder having an internal bore extending lengthwise into said shielding cylinder, said bore being closed at one end with an end wall and open at another end of said shielding cylinder, each bolt having a threaded shank passing through a hole in said end wall and into said air bag canister;

a locking cylinder slidably received in said another end of each bolt shield cylinder, each locking cylinder having a locking tang guided in a lengthwise groove in said internal bore and received in a locking recess aligned with said groove and extending radially outward from said bore to a greater depth into an inside wall of said bolt shield cylinder bore than said groove to be retained therein, said locking cylinder tang retractable out of said recess by rotation of a key inserted in a key slot.

\* \* \* \* \*